Patented Jan. 7, 1930

1,742,349

UNITED STATES PATENT OFFICE

VERNON W. HAAG, HARRY E. BIGLER, AND IVAN L. HAAG, OF CHICAGO, ILLINOIS

ANTIFREEZE COMPOUND

No Drawing.   Application filed November 27, 1925. Serial No. 71,785.

The present invention has to do with a mixture intended for cooling purposes, such as the liquid used in the cooling system of an explosion or gasoline engine, and the process for the production of such a liquid.

Motor in the winter in cold climates has heretofore been accompanied by serious disadvantages incident to preventing water or other material used as a medium in the cooling system of the engine from freezing, or from becoming overheated as a result of precautions taken against freezing. Until the present invention, there has been no wholly satisfactory anti-freeze liquid for use in automobiles.

Dilute alcoholic solutions in the water pumping system of an engine have been unsatisfactory because of the rapid volatilization of such alcohol, and the ever present uncertainty relative to the strength of such alcoholic solutions. Believing that a particular solution contained sufficient alcohol has often led to disastrous results, either because the circulatory system has frozen, or because of overheating due to an excess of alcohol. Explosions of radiators wherein alcohol is used are not uncommon in moderately cold and in cold climates.

Glycerine has recently come into prominence as an anti-freeze medium. There are several disadvantages, however, to the employment of glycerine. In the first place, success may be had only when a high percentum of glycerine is used. The practice now generally followed is to employ solutions having fifty percent or more glycerine.

Glycerine at the present time is highly expensive, and has been recently removed from the open market in several cities as a result of commercial conditions incident to large consumption in anti-freeze compounds. A second disadvantage in the employment of glycerine is that at about 15 degrees below zero, Fahrenheit, a solution of glycerine and water, in which as much as fifty percent of glycerine is employed, will become slush and is then unsatisfactory.

The ideal anti-freeze compound should comprise a liquid which will retain its fluidity at a temperature of 25 or 30 degrees minus, Fahrenheit, and which can be produced at considerable less expense than a fifty percent solution of glycerine, and which does not possess the volatility of alcohol or a volatility greater than water. A solution which will last an entire winter on a single filling is highly desirable.

All of these features are secured in the solution forming the subject matter of this application for patent and which solution will now be described. It is for the purpose of attaining these objects that the present invention was conceived.

For producing the solution here described, a glucose having a specific gravity of forty-five (45) degrees Baumé is procured. This glucose commercially is a corn syrup containing approximately thirty-eight percent (38%) glucose, thirty-eight percent (38%) dextrose, and the remainder water.

Glucose of the character described is heated to substantially two hundred twelve (212) degrees Fahrenheit. The heat may be applied to the glucose in an open vessel, but preferably, a steam jacketed vessel should be employed. To this ingredient is added one-third (⅓) of the volume of water which is to be used in the preparation of the whole solution and which latter amount is generally the same weight as the glucose.

The glucose when heated will readily dissolve in this volume of water, and the glucose and water solution is then mixed with the remainder of the water to be used and which may be added cold or hot as desired, after which the required volume of glycerine is incorporated.

The glycerine to be employed is commercial glycerine, ordinarily known in the market as "yellow distilled."

For temperatures which do not fall below twenty-five (25) degrees below zero, Fahrenheit, the proper proportions of the ingredients described are equal parts of each by weight. For colder climates, the proportion of water is reduced and that of glycerine and glucose is correspondingly increased. In warmer belts or zones, the volume of water is increased which correspondingly reduces the weight of glycerine and glucose employed.

The mixture, after complete solution of the several ingredients, is placed in the water circulatory or cooling system of a gasoline engine or other device, such system or device first being drained of all of its contents. For the purpose of preventing leakages at the joints, hose connections should be renewed if in bad condition or, if in good condition, a quantity of shellac should be applied about the joints to prevent leakage. The solution placed in a system in the fall may be used for the entire cold season, for the solution is non-volatile except as to the water and will not decompose or otherwise become useless. It may be withdrawn at the approach of warmer weather to be stored for the next cold season. Should evaporation occur, water is added to maintain a uniformity of strength. The glycerine and glucose do not volatilize.

By replacing a large proportion of the glycerine as now used in anti-freeze solutions with glucose, a great proportion of the cost is saved, but at the same time, the efficiency of the solution is increased. The present invention results in a solution which does not become slushy at twenty-five (25) degrees minus, Fahrenheit, as a fifty (50) percent solution of glycerine does. In physical characteristics, the present solution resembles a glycerine solution, there being some difference, however, in the specific gravity.

We claim:—

An anti-freeze mixture consisting of water, glycerine, and glucose, said ingredients being in substantially equal proportions by weight.

VERNON W. HAAG.
HARRY E. BIGLER.
IVAN L. HAAG.